United States Patent
Adams et al.

(10) Patent No.: US 9,766,484 B2
(45) Date of Patent: Sep. 19, 2017

(54) ELECTRO-OPTICAL MODULATOR USING WAVEGUIDES WITH OVERLAPPING RIDGES

(71) Applicant: CISCO TECHNOLOGY, INC., San Jose, CA (US)

(72) Inventors: Donald Adams, Allentown, PA (US); Prakash Gothoskar, Allentown, PA (US); Vipulkumar Patel, Breinigsville, PA (US); Mark Webster, Bethlehem, PA (US)

(73) Assignee: Cisco Technology, Inc., San Jose, CA (US)

( * ) Notice: Subject to any disclaimer, the term of this patent is extended or adjusted under 35 U.S.C. 154(b) by 521 days.

(21) Appl. No.: 14/248,081

(22) Filed: Apr. 8, 2014

(65) Prior Publication Data

US 2016/0170240 A1    Jun. 16, 2016

Related U.S. Application Data

(60) Provisional application No. 61/931,314, filed on Jan. 24, 2014.

(51) Int. Cl.
  *G02F 1/025* (2006.01)
  *G02B 6/13* (2006.01)
  (Continued)

(52) U.S. Cl.
  CPC .............. *G02F 1/025* (2013.01); *G02B 6/132* (2013.01); *G02B 6/136* (2013.01); *G02F 1/011* (2013.01);
  (Continued)

(58) Field of Classification Search
  CPC ......... G02B 6/132; G02B 6/136; G02F 1/025; G02F 2001/0152; G02F 1/011; G02F 1/225
  (Continued)

(56) References Cited

U.S. PATENT DOCUMENTS 5,621,837 A * 4/1997 Yamada ................. G02B 6/42
  385/88
6,316,281 B1   11/2001 Lee et al.
  (Continued)

FOREIGN PATENT DOCUMENTS

| JP | 2004258119 A | 9/2004 |
| WO | 2013146317 A1 | 10/2013 |
| WO | 2014155450 A1 | 10/2014 |

OTHER PUBLICATIONS

Hergenrother, J.M. et al., 50 nm Vertical Replacement-Gate (VRG) nMOSFETs with ALD HfO2 Gate Dielectrics, International Electron Devices Meeting, Dec. 2001, Technical Digest, Washington, DC, United States.
(Continued)

*Primary Examiner* — Akm Enayet Ullah
(74) *Attorney, Agent, or Firm* — Patterson + Sheridan, LLP

(57) ABSTRACT

An optical modulator may include a lower waveguide, an upper waveguide, and a dielectric layer disposed therebetween. When a voltage potential is created between the lower and upper waveguides, these layers form a silicon-insulator-silicon capacitor (also referred to as SISCAP) guide that provides efficient, high-speed optical modulation of an optical signal passing through the modulator. In one embodiment, at least one of the waveguides includes a respective ridge portion aligned at a charge modulation region which may aid in confining the optical mode laterally (e.g., in the width direction) in the optical modulator. In another embodiment, ridge portions may be formed on both the lower and the upper waveguides. These ridge portions may be aligned in a vertical direction (e.g., a thickness
(Continued)

direction) so that ridges overlap which may further improve optical efficiency by centering an optical mode in the charge modulation region.

15 Claims, 17 Drawing Sheets

(51) Int. Cl.
 *G02B 6/12* (2006.01)
 *G02F 1/01* (2006.01)
 *G02B 6/132* (2006.01)
 *G02B 6/136* (2006.01)
 *G02F 1/225* (2006.01)
 *G02F 1/015* (2006.01)
(52) U.S. Cl.
 CPC .... *G02F 1/2257* (2013.01); *G02F 2001/0152* (2013.01)
(58) Field of Classification Search
 USPC ..................................... 385/2–4, 14, 20, 24
 See application file for complete search history.

(56) References Cited

U.S. PATENT DOCUMENTS

| | | | |
|---|---|---|---|
| 6,778,751 B2 | 8/2004 | Tada et al. | |
| 6,845,198 B2* | 1/2005 | Montgomery | G02F 1/2257 359/245 |
| 7,411,988 B2* | 8/2008 | Tanaka | H01S 5/16 372/43.01 |
| 7,760,980 B2 | 7/2010 | West et al. | |
| 7,991,249 B2 | 8/2011 | Li | |
| 8,160,404 B2* | 4/2012 | Pan | G02F 1/025 385/129 |
| 8,358,674 B2* | 1/2013 | Sonobe | B82Y 20/00 372/43.01 |
| 8,363,986 B2 | 1/2013 | Webster et al. | |
| 8,741,684 B2* | 6/2014 | Bogaerts | G02B 6/12004 257/E31.032 |
| 9,142,698 B1* | 9/2015 | Cunningham | H01L 31/02327 |
| 9,244,296 B2* | 1/2016 | Iwatsuka | G02F 1/0316 |
| 9,360,688 B2* | 6/2016 | Patel | G02B 6/132 |
| 9,407,065 B2* | 8/2016 | Takagi | H01S 5/2054 |
| 9,429,776 B2* | 8/2016 | Shi | G02F 1/025 |
| 2002/0048433 A1* | 4/2002 | Wu | G02B 6/12 385/49 |
| 2002/0154843 A1* | 10/2002 | Betts | G02F 1/0356 385/2 |
| 2003/0063885 A1* | 4/2003 | Gunn, III | B82Y 20/00 385/131 |
| 2003/0141511 A1* | 7/2003 | Marsh | B82Y 20/00 257/98 |
| 2004/0208454 A1* | 10/2004 | Montgomery | G02F 1/2257 385/50 |
| 2005/0158002 A1 | 7/2005 | Kubby et al. | |
| 2005/0171542 A1* | 8/2005 | Biedermann | A61B 17/7032 606/278 |
| 2005/0287696 A1* | 12/2005 | Dumais | B82Y 10/00 438/69 |
| 2006/0133754 A1 | 6/2006 | Patel et al. | |
| 2007/0053643 A1* | 3/2007 | West | G02B 6/12004 385/131 |
| 2011/0211786 A1 | 9/2011 | Ushida et al. | |
| 2012/0257850 A1* | 10/2012 | Fujikata | G02F 1/025 385/3 |
| 2015/0212344 A1* | 7/2015 | Patel | G02B 6/132 385/2 |
| 2016/0154180 A1* | 6/2016 | Fournier | G02B 6/1342 438/31 |

OTHER PUBLICATIONS

Hafnium Oxide HfO2 for Optical Coating, Materion, 2014, Materion Corporation, Tucson, United States, <http://materion.com/ResourceCenter/ProductData/InorganicChemicals/Oxides/BrochuresAndDataSheets/HafniumOxideHfO2.aspx>.
Liao, Ling et al., High speed silicon Mach-Zehnder modulator, OpticsInfoBase: OSA's Digital Library, Apr. 18, 2005, vol. 13, No. 8, Washington, DC, United States.
Liu, Ansheng et al., A high-speed silicon optical modulator based on a metal-oxide-semiconductor capacitor, nature.com, vol. 427, pp. 615-619, Feb. 12, 2004, Nature Publishing Group, London, United Kingdom.
Fujikata, Junichi et al., 25 GHz Operation of Silicon Optical Modulator with Projection MOS Structure, 2010 Conference on Optical Fiber Communication, Mar. 2010, IEEE, Piscataway, United States.
European Patent Office, International Search Report & Written Opinion, Application No. PCT/US2015/012608, pp. 1-12, dated Apr. 15, 2015.

* cited by examiner

ELECTRO-OPTICAL MODULATOR USING WAVEGUIDES WITH OVERLAPPING RIDGES

CROSS-REFERENCE TO RELATED APPLICATIONS

This application is a non-provisional application of U.S. provisional application Ser. No. 61/931,314, filed Jan. 24, 2014. The aforementioned related patent application is herein incorporated by reference in its entirety.

TECHNICAL FIELD

Embodiments presented in this disclosure generally relate to optical modulation and, more specifically, to silicon-based electro-optical modulators.

BACKGROUND

Many electro-optic devices exploit the free carrier dispersion effect to change both the real and imaginary parts of the refractive index. This exploitation is used since the unstrained pure crystalline silicon does not exhibit a linear electro-optic (Pockels) effect, and the refractive index changes due to the Franz-Keldysh effect and Kerr effect are very weak. Phase modulation in a specific region of optical devices, such as Mach-Zehnder modulators, total-internal-reflection (TIR)-based structures, cross switches, Y-switches, ring resonators and Fabry-Perot resonators, may be used to modulate the output intensity.

Free carrier concentration in electro-optic devices can be varied by injection, accumulation, depletion or inversion of carriers. Most of such devices investigated to date present some common features: they require long interaction lengths (for example, 5-10 mm) and injection current densities higher than 1 kA/cm$^3$ in order to obtain a significant modulation depth. Long interaction lengths are undesirable in order to achieve high levels of integration and miniaturization for fabricating low-cost compact device arrangements. High current densities may induce unwanted thermo-optic effects as a result of heating the structure and will, indeed, cause an opposite effect on the real refractive index change relative to that associated with free carrier movement, thus reducing its effectiveness.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
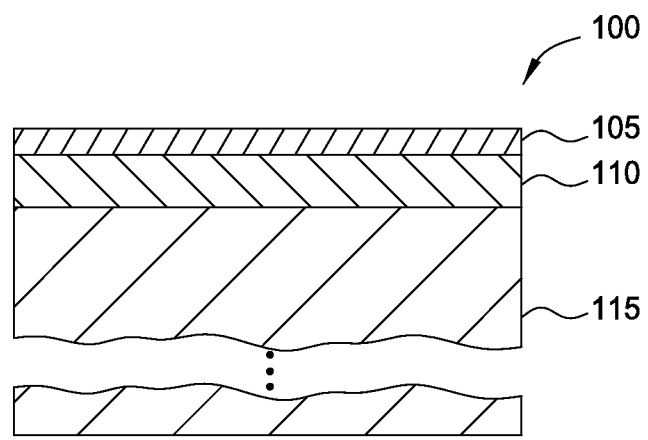
FIG. 1 illustrates a SOI device, according to one embodiment disclosed herein.

One embodiment presented in this disclosure is an optical device that includes a first silicon waveguide disposed on a dielectric substrate where the first silicon waveguide includes a first ridge extending in a direction of an optical path. The optical device includes a dielectric layer having a lower surface disposed on an upper surface of the first ridge and a second silicon waveguide disposed on an upper surface of the dielectric layer opposite the lower surface of the dielectric layer. The second silicon waveguide includes a second ridge extending in a direction of the optical path and the second ridge overlaps both the dielectric layer and the first ridge. Furthermore, the first silicon waveguide is doped a first conductivity type and the second silicon waveguide is doped a second, different conductivity type. The optical device also includes a first electrical contact coupled to the first silicon waveguide and a second electrical contact coupled to the second silicon waveguide.

Another embodiment described herein includes a method for forming an optical device. The method includes forming a first silicon waveguide on a dielectric substrate where the first silicon waveguide includes a first ridge extending in a direction of an optical path. The method includes forming a dielectric layer on the first ridge and forming a second silicon waveguide disposed on an upper surface of the dielectric layer opposite a lower surface of the dielectric layer contacting the first ridge. The second silicon waveguide includes a second ridge extending in a direction of the optical path where the second ridge overlaps both the dielectric layer and the first ridge. Furthermore, the first silicon waveguide is doped a first conductivity type and the second silicon waveguide is doped a second, different conductivity type. The method includes coupling a first electrical contact to the first silicon waveguide and coupling a second electrical contact to the second silicon waveguide.

Another embodiment described herein is an optical device that includes a first waveguide comprising a first ridge extending in a direction of an optical path and a dielectric layer having a lower surface disposed on an upper surface of the first ridge. The optical device includes a second waveguide disposed on an upper surface of the dielectric layer opposite the lower surface of the dielectric layer. The second waveguide includes a second ridge extending in a direction of the optical path where the second ridge overlaps the first ridge. Furthermore, the first waveguide is doped a first conductivity type and the second waveguide is doped a second, different conductivity type. The optical device also includes a first electrical contact coupled to the first waveguide and a second electrical contact coupled to the second waveguide.

Example Embodiments

An optical modulator may include a lower waveguide, an upper waveguide, and a dielectric layer disposed therebetween. When a voltage potential is created between the lower and upper waveguides, these layers form a silicon-insulator-silicon capacitor (also referred to as SISCAP) guide that provides efficient, high-speed optical modulation of an optical signal passing through the modulator. In one embodiment at least one of the waveguides includes a respective ridge portion (referred to as a ridge or ribbed waveguide) aligned at a charge modulation region. This ridge portion aids in confining the optical mode laterally (e.g., in the width direction) in the optical modulator which may result in more light of the optical mode passing within the charge modulation and improving the efficiency of the modulator.

In another embodiment, ridge portions may be formed on both the lower and the upper waveguides. These ridge portions may be aligned in a vertical direction (e.g., a thickness direction) so that ridges overlap. If the greatest intensity of the optical signal is approximately in the middle of the optical mode, using two aligned ridge portions centers the optical mode in the middle of the charge modulation region which may result in the greatest intensity of the optical signal falling within the charge modulation region.

FIG. 1 illustrates a Silicon-On-Insulator (SOI) device 100, according to one embodiment disclosed herein. SOI device 100 includes a surface layer 105, a buried insulation layer 110 (also referred to as buried oxide (BOX) layer), and a semiconductor substrate 115. Although the embodiments herein refer to the surface layer 105 and substrate 115 as silicon, the disclosure is not limited to such. For example, other semiconductors or optically transmissive materials may be used to form the structure 100 shown here. Moreover, the surface layer 105 and the substrate 115 may be made of the same material, but in other embodiments, these layers 105, 115 may be made from different materials.

The thickness of the surface layer 105 may range from less than 100 nanometers to greater than a micron. More specifically, the surface layer 105 may be between 100-300 nanometers thick. The thickness of the insulation layer 110 may vary depending on the desired application. The thickness of the insulation layer 110 may directly depend on the size of the mode being coupled to the SOI device 100 and the desired efficiency. As such, the thickness of insulation layer 110 may range from less than one micron to tens of microns. The thickness of the substrate 115 may vary widely depending on the specific application of the SOI device 100. For example, the substrate 115 may be the thickness of a typical semiconductor wafer (e.g., 100-700 microns) or may be thinned and mounted on another substrate.

For optical applications, the silicon surface layer 105 and insulation layer 110 (e.g., silicon dioxide, silicon nitride, and the like) may provide contrasting refractive indexes that vertically confine an optical signal in a waveguide in the surface layer 105. In a later processing step, the surface layer 105 of the SOI device 100 may be etched to form one or more silicon waveguides. Because silicon has a high refractive index compared to an insulator such as silicon dioxide, the optical signal remains primarily in the waveguide as it propagates across the surface layer 105.

Figure 2A:
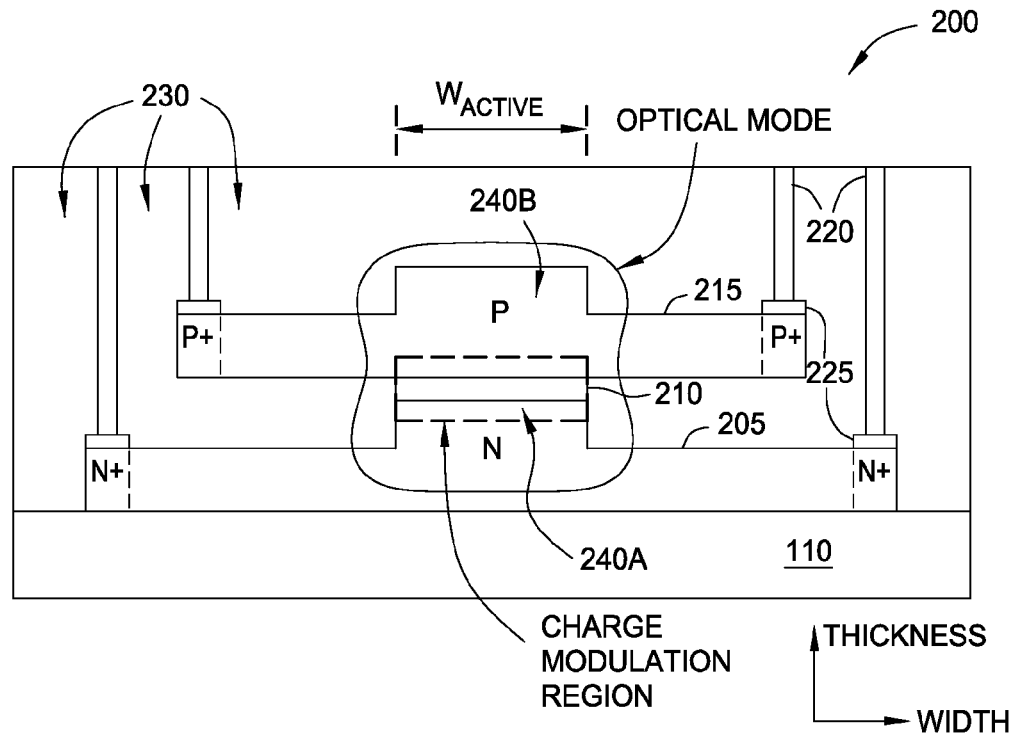
FIGS. 2A-2B illustrate cross-sectional views of aligned modulators, according to embodiments disclosed herein.
Figure 2B:
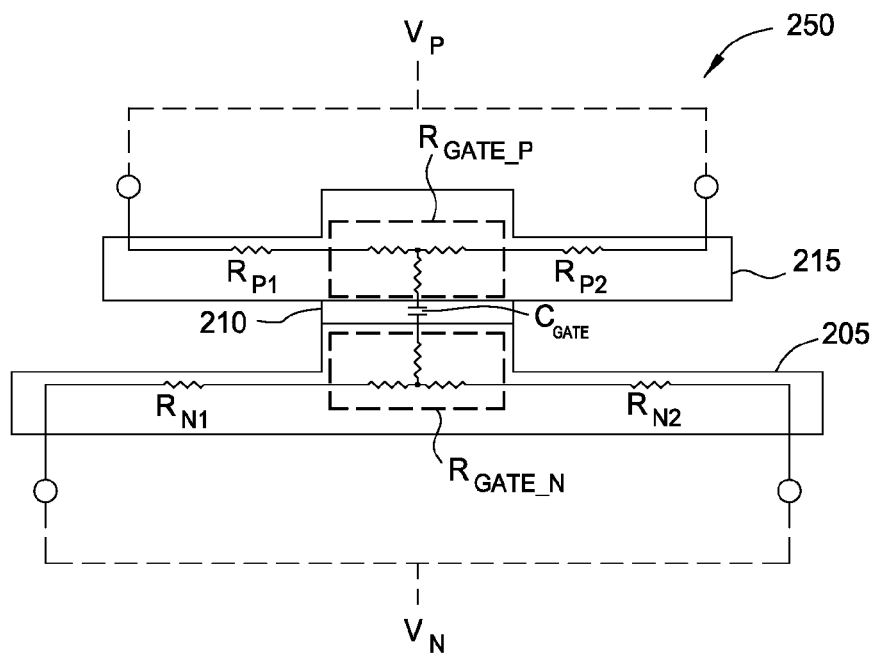

Ridge Waveguides for Improved Optical Mode Confinement and Modulation Efficiency FIGS. 2A-2B illustrate cross-sectional views of aligned modulators, according to embodiments disclosed herein. Specifically, the modulator 200 shown in FIG. 2A may be a silicon-based electro-optic modulator that includes a lower silicon waveguide 205 doped a first conductivity type (e.g., N-type) that is spaced apart from a upper silicon waveguide 215 doped a second, different conductivity type (e.g., P-type) by a gate dielectric layer 210. The arrangement of the lower waveguide 205, gate dielectric layer 210, and upper waveguide 215 forms a silicon-insulator-silicon capacitor (also referred to as SISCAP) guide that provides efficient, high-speed optical modulation of an optical signal passing through the modulator 200. Specifically, FIGS. 2A-2B are cross sections of the SISCAP structure where the optical signal travels in a direction into, or out of, the page. FIG. 2A illustrates the vertical and lateral confinement of the optical mode of the signal by the insulation layer 110 and the dielectric material 230 (e.g., silicon dioxide or silicon nitride) surrounding the waveguides 205 and 215. Moreover, the thicknesses and widths of the waveguides 205 and 215 may be selected in order to aid the confinement of the optical mode.

The gate dielectric layer 210 establishes a charge modulation region or charge accumulation region shown by the dashed box where free carriers (e.g., electrons and holes) flow into and out of the p-doped and n-doped waveguides 205 and 215. Doing so creates an active region (defined by $W_{ACTIVE}$) where the switching function associated with the modulator 200 (e.g., switching speeds above 1 Gb/s) can be controlled by a voltage potential across the gate dielectric layer 210. In one embodiment, the voltage potential is used to alter the phase of the optical signal propagating through the modulator as in, for example, a Mach-Zehnder interferometers (MZI). However, the modulators described herein may also be used in other types of devices such as ring resonators, Fabry-Perot cavities, etc.

The gate dielectric layer 210 may be referred to as either "gate dielectric" or "gate oxide" where it is to be understood that an oxide is only an exemplary form of a dielectric that may be used in the modulator device. The gate dielectric layer 210 may comprise any material that allows for fast charging/discharging of the free carries (e.g., enables switching speeds greater than or equal to 1 Gb/s). A non-limiting list of suitable materials include hafnium oxide, oxynitride, bismuth oxide, silicon nitride, silicon oxide, and combinations of these materials. Furthermore, using high-K dielectric materials as the gate dielectric provide higher capacitance and greater charge densities over using dielectrics with lower dielectric constants (assuming same thickness and voltage potential). For example, hafnium oxide and silicon nitride (high-K dielectrics) have higher dielectric constants than silicon dioxide, and thus, enable greater charge densities across the gate dielectric layer relative to using silicon dioxide. Using the higher voltages may increase the modulation efficiency—i.e., the amount the optical signal is phase shifted relative to the applied voltage.

Although the Figures described herein illustrate placing a gate dielectric layer 210 between the opposite doped waveguides, this is not a requirement. For all the embodiments described herein, the modulators may still perform optical modulation if the gate dielectric layer 210 is omitted and the two waveguides directly contact to form a PN junction. In this example, the PN junction establishes the charge modulation region where the free carriers flow into and out of the waveguides. However, including the gate dielectric layer 210 may improve the efficiency of the optical modulation.

As shown, the lower waveguide 205 is doped N-type while the upper waveguide 215 is doped P-type. However, for all the embodiments where the dopant type is specified, the dopant types may be reversed—e.g., the lower waveguide 205 may be doped P-type while the upper waveguide 215 is N-type. Furthermore, the waveguides 205 and 215, which serve as electrodes for the capacitive structure of the modulator 200, may be silicon based. For example, the material of the waveguides 205, 215 may include strained silicon, $Si_xGe_{1-x}$, substantially single crystal silicon (i.e., crystalline silicon), polycrystalline silicon, and combinations thereof. In one embodiment, because of process constraints that will be discussed later, the lower waveguide 205 may include crystalline silicon while the upper waveguide 215 may be polycrystalline silicon. However, in other embodiments, both waveguides 205 and 215 may be made from crystalline silicon or polycrystalline silicon.

A width of the waveguides 205 and 215 may be selected to keep electrical contacts 225, which may be metallic or formed from silicide, and vias 220 out of the optical mode. Because electrically conductive materials have a deleterious effect on the optical modulation, the waveguides 205 may be designed such that any conductive contacts are sufficiently outside the boundaries of the optical mode. Moreover, as shown in FIG. 2A, the portions of the waveguides 205, 215 proximate to the contacts 225 are more heavily doped than the portions of the waveguide 205, 215 where optical modulation occurs. Doing so may improve the electrical connection between the silicon-based waveguides 205, 215 and the contacts 225 thereby lowering the electrical resistance and RC constant associated with the modulator 200. Heavily doping the portion of the waveguides proximate to the electrical connection to an external voltage source may be applied to any of the embodiments described herein. Furthermore, the concentration of the dopant may increase in the waveguides 205, 215 as the distance from the optical mode increases. Because the dopant may have a deleterious effect on the optical signal, the dopant concentration in the waveguides 205 and 215 where the optical mode is located may be lightly doped. The dopant concentration may be increased in a step-wise or continuous manner as the distance from the optical mode increases. Doing so improves the electrical conductivity of the waveguides 205 and 215 and mitigates the negative affect the dopant has on the optical signal. Furthermore, in one embodiment, the electrical contacts 225 are omitted and the vias 220 contact the heavily doped portions of the waveguides 205, 215 directly.

In one embodiment, the width of the active region (i.e., the width of the gate dielectric layer 210) is less than a micron, and more specifically, less than half a micron. The thickness of the waveguides 205 and 215 (excluding the ridge portions 240A and 240B) may range between 50-200 nanometers. In one embodiment, to center the greatest intensity of the light in the optical mode in the charge modulation region, the respective thicknesses of the waveguides 205 and 215 are the same. The thickness of the gate dielectric layer 210 may range from 20 nanometers to 1 or 2 nanometers.

Each waveguide 205, 215 includes a respective ridge portion 240 (referred to as ridge or ribbed waveguides) aligned at the charge modulation region. In addition to the ridge portions being aligned, the ridge portions may be centered on the respective waveguides 205, 215 although this is not a requirement. The ridge portions 240A-B aid in confining the optical mode laterally (e.g., in the width direction) in the modulator 200. As shown, the lower ridge portion 240A is surrounded on two sides by the dielectric material 230 which confines the optical mode near the charge modulation region because of the different refractive indexes associated with the material of the dielectric 230 and the waveguide 205. If the ridge portion 240A was omitted and the bottom portion of the lower waveguide 205 directly contacted the gate dielectric layer 210, the optical mode may spread out laterally within the lower waveguide 205 more so than what is illustrated in FIG. 2A. As such, more of the light in the optical mode would not be within the charge modulation region thereby reducing the efficiency of the modulator 200. In one embodiment, the thicknesses of the ridge portions 240 are around 40-60% of the thickness of the bottom portion of the waveguides 205 and 215. Furthermore, the actual thickness values of the ridge portions 240 may be determined by the desired confinement of the optical mode in the lateral dimension (i.e., the width dimensions) relative to the doping levels and distances of the P+/N+ contact regions from the portion of the waveguides 205 and 215 overlapping with the gate layer 210.

Furthermore, adding the ridge portion 240B to the upper waveguide 240B also may improve the efficiency of the modulator 200 relative to using only the ridge portion 240A. In the SISCAP design shown, the greatest intensity of the optical signal is approximately in the middle of the optical mode. Without the upper ridge 240B, the center of the optical mode may be below the gate dielectric layer 210. Assuming that the thicknesses of the ridge portions 240A-B are the same, in modulator 200, the center of the optical mode is near or proximate to the gate dielectric layer 210. This results in the greatest intensity of the optical signal falling within the charge modulation region. Stated differently, although adding the ridge portion 240B may decrease the vertical confinement of the optical mode, the ridge portion 240B aligns the optical mode such that the greatest intensity of the optical signal is within the charge modulation region thereby improving efficiency.

In FIG. 2B the equivalent electrical circuit is overlaid onto a modulator 250 with aligned ridge portions as discussed above. As shown, the two electrical contacts 225 on the left and right sides of the upper waveguide 215 are driven with the same voltage $V_P$ while the two contacts 225 on the left and right sides of the lower waveguide 215 are driven with the same voltage $V_N$. Because the resistances $R_{P1}$ and $R_{P2}$ in the upper waveguide 215 and the resistances $R_{N1}$ and $R_{N2}$ in the lower waveguide 205 are driven with the same respective voltages, these resistances are in parallel thereby halving these resistances and reducing the RC constant of the modulator 250. For example, the modulator 250 can be compared to another SISCAP design where instead of the upper and lower waveguides begin centered, respective ends of the waveguides overlap to form the charge modulation region (e.g., the rightmost end of the upper waveguide overlaps the leftmost end of the lower waveguide) while the other end is used as an electrical contact to connect to voltages $V_P$ and $V_N$ to control the optical modulation (e.g., the leftmost end of the upper waveguide is connected to $V_P$ and the rightmost end of the lower waveguide is connected to $V_N$). In this example SISCAP structure, each waveguide has only one electrical connection while the modulator 250 in FIG. 2B has two electrical connections to the same voltage.

Assuming the waveguides in modulator 250 have the same width as the waveguides in the modulator where the ends of the waveguides overlap, the electrical resistance between the electrical connections to the capacitance $C_{GATE}$ is only half as long in modulator 250 relative to the modulator where the ends of the waveguides overlap. Furthermore, because the resistances $R_{P1}/R_{P2}$ and $R_{N1}/R_{N2}$ are in parallel (assuming the voltage on both electrical contacts of a waveguide is the same), this also halves the resistance between the electrical connection and the dielectric layer 210 which forms the capacitance $C_{GATE}$. As such, the resistance of the modulator 250 between the electrical connections and the gate dielectric layer 210 may be one fourth the corresponding resistance for the modulator where the ends of the waveguides overlap. This may result in a reduction of the total RC constant of modulator 250 which may increase the modulation bandwidth of modulator 250 relative to the modulator where the waveguide ends overlap.

Moreover, for clarity, some of the modulators illustrated in the figures do not show the P and N doping schemes and the conductive contacts and/or vias used to connect the waveguides to a modulation voltage. For example, the doping scheme for the waveguides and the electrical connections shown in FIG. 2A may be applied to any of the modulators shown in FIGS. 4E, 5A-5B, 6A-6B, 7, 8A-8C, 9A-9D, 10, 11C, and 12.

Figure 3A:
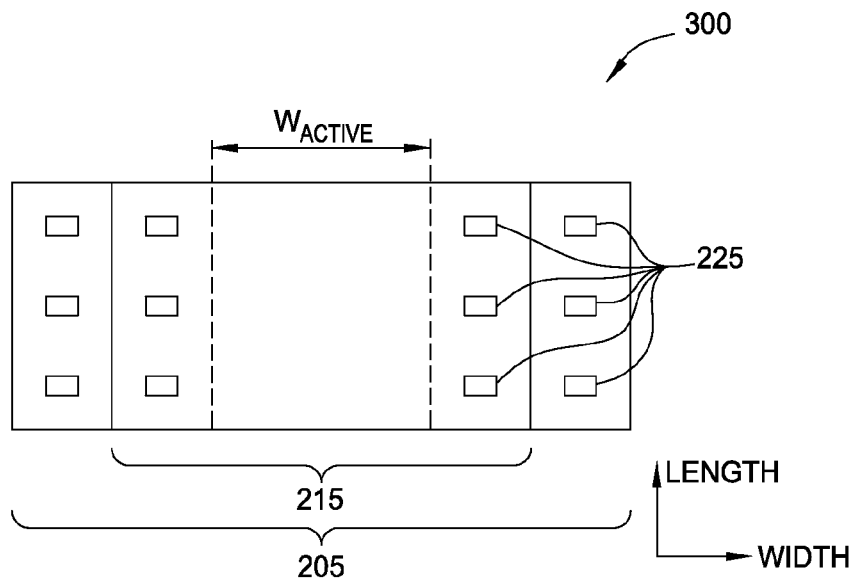
FIGS. 3A-3B illustrates top views of a modulator with aligned ridges, according to embodiments disclosed herein.
Figure 3B:
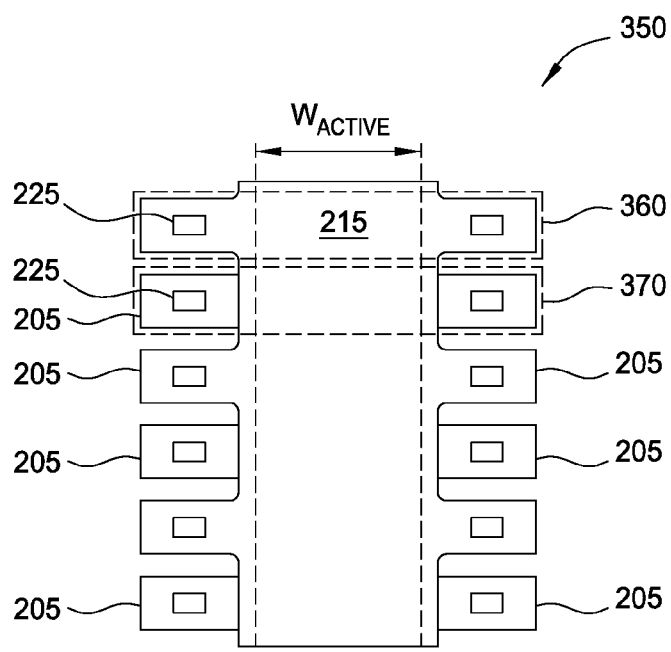

FIGS. 3A-3B illustrate top views of the modulators shown in FIG. 2A-2B, according to embodiments disclosed herein. In FIG. 3A, only the top surface of the upper waveguide 215 and the portion of the top surface of the lower waveguide 205 not occluded by the upper waveguide 215 are shown. For clarity, any vias or dielectric material is omitted from these views. The top surfaces include a plurality of electrical contacts 225. In one embodiment, all the electrical contacts 225 on the upper waveguide 215 and all the contacts 225 on the lower waveguide 205 are driven using the same voltages, e.g., $V_P$ and $V_N$, respectively. Varying the voltages causes a voltage difference in the active region which changes the free carriers in the charge modulation region and changes the phase of the optical signal traveling along the length of the modulator 300. In FIG. 3A, the width of the lower waveguide 205 is greater than the width of the upper waveguide 215 in order to provide room for vias (not shown) to extend from, for example, an upper surface of the modulator to the electrical contacts 225.

In the modulator 350 shown in FIG. 3B, the electrical contacts 225 on the waveguides are interleaved which may reduce the overall width of the modulator. Here, the first row 360 of the modulator 350 is used to connect contacts 225 on the upper waveguide 215 to a voltage source that drives the voltage $V_P$. Conversely, the second row 370 of modulator 350 is used to connect contacts 225 on the lower waveguide 205 to a voltage source that drives the voltage $V_N$. In this manner, each row of the modulator may switch between contacts 225 used to connect to the lower and upper waveguides 205, 215. The length of the modulators 300 and 350 may range from 50 microns to 1000 microns. In one embodiment, for modulators 300 and 350 driven by voltages around +/−1V, the length may be between 250-450 microns.

Modulator 300 of FIG. 3A provides lower series resistance than modulator 350 in FIG. 3B but there exists a parasitic capacitance between the lower waveguide 205 and upper waveguide 215 in the regions where the lower waveguide 205 extends beyond the width of the upper waveguide 215. However, the design of the modulator 350 in FIG. 3B reduces the parasitic capacitance in this region. Furthermore, one of the two modulators 300, 350 may be preferred depending on spatial limitations. For example, if space in an optical system is limited in the width direction, then modulator 350 may be preferred over modulator 300. If the length of the modulator is a critical design feature, then the reverse may be true.

Although modulators 300 and 350 are discussed specifically in relationship to FIGS. 2A and 2B, these top views may also be the top views of other modulators described herein. For example, the modulators described in FIGS. 4E, 5A-5B, 6A-6B, 7, 8A-8C, 9A-9D, 10, 11C, and 12 may be designed with top views as shown in FIGS. 3A and 3B.

Figure 4A:
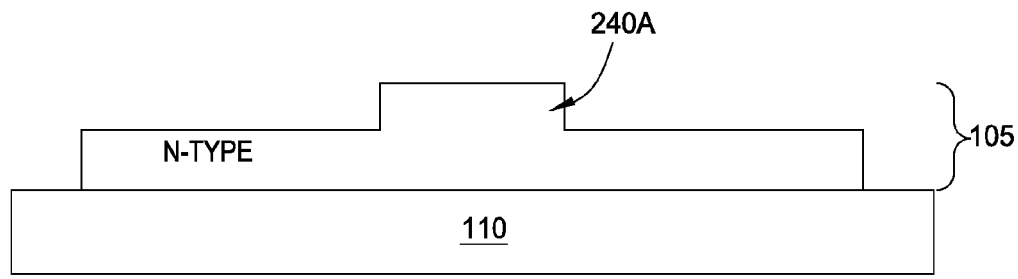
FIGS. 4A-4E illustrate a flow for fabricating aligned modulators, according to embodiments disclosed herein.

FIGS. 4A-4E illustrate a flow for fabricating modulators with aligned ridges, according to embodiments disclosed herein. In FIG. 4A, the lower waveguide 205 is formed on the insulation layer 110. To do so, the silicon layer 105 of the SOI structure 100 shown in FIG. 1 may be patterned and etched in one or more steps to form the ridge portion 240A. If the silicon surface layer 105 is crystalline, then the resulting lower waveguide 205 is also made of single crystal silicon, however, this is not a requirement. Moreover, either before or after the lower waveguide 205 is formed, the silicon may be doped. The doping may either be uniform throughout the waveguide 205 or may vary at different portions. For example, as shown in the modulator 200, the rightmost and leftmost ends of the waveguide 205 are relatively heavily doped N-type while the middle portion is relatively lightly doped.

Figure 4B:
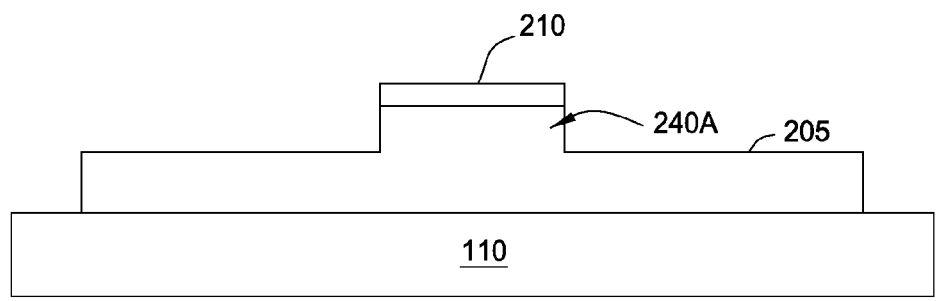

In FIG. 4B, the gate dielectric layer 210 is deposited onto the lower waveguide 205. This may be performed by depositing a conformal dielectric layer onto the waveguide 205 and then selectively removing the dielectric material that is not on the ridge portion 240A. Alternatively, if the gate layer 210 is made from silicon dioxide, the gate layer 210 may be grown thermally using the lower silicon waveguide 205.

Figure 4C:
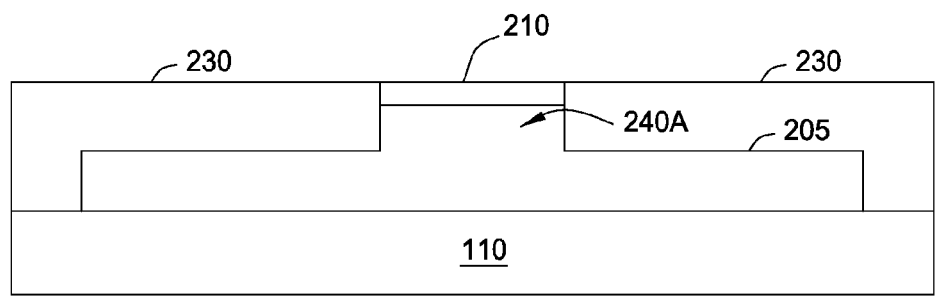

In FIG. 4C, the dielectric material 230 is deposited onto the modulator. In order to expose a top surface of the gate dielectric layer 210, the modulator may be planarized. Moreover, process steps shown in FIGS. 4B and 4C may be reversed where the dielectric material 230 is deposited and planarized before being patterned and etched to form a cavity for the gate dielectric material 210.

Although FIGS. 4B and 4C illustrate forming the gate dielectric layer 210 before depositing and planarizing the dielectric material 230, in one embodiment, the gate layer 210 is formed (e.g., grown from the silicon of the lower waveguide 205 or deposited) after the dielectric material 230 has been deposited. This may be preferred since removing the dielectric material 230 from an already formed gate layer 210 may affect the quality of the gate layer 210 or the interface between the gate layer 210 and the upper waveguide 215.

Figure 4D:
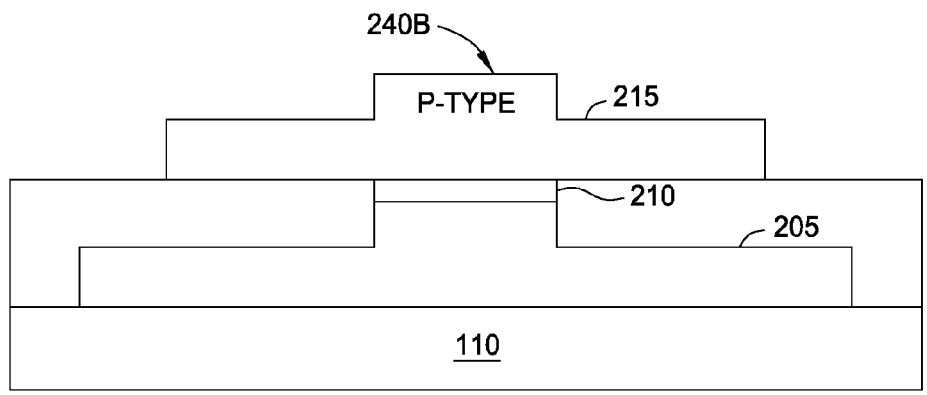

In FIG. 4D, the upper waveguide 215 is formed on the modulator. In one embodiment, a silicon-based material (e.g., polysilicon) is deposited onto the top surface with a thickness greater than the maximum thickness of the upper waveguide 215. Using one or more etching steps, the silicon-based material is then etched to form the upper waveguide 215 with the ridge portion 240B. For example, the silicon-based material may first be etched to define the width of the waveguide 216 the surface of the ridge portion 240A. The modulator may then be patterned and etched a second time to form the sides of the ridge portion 240A. In another embodiment, the bottom portion of the upper waveguide 215 is deposited and patterned in a first step. In a second step, additional silicon-based material is deposited and etched to form the ridge portion 240A.

The upper waveguide 215 may also be doped to the desired conductivity type. This may occur either as the silicon-based material is deposited onto the modulator (e.g., the silicon-based material already includes the desired concentration of the dopant—in-situ doping) or done separately in a later processing step. Moreover, the dopant concentration may be uniform throughout the upper waveguide 215 or may vary as shown in FIG. 2A.

Figure 4E:
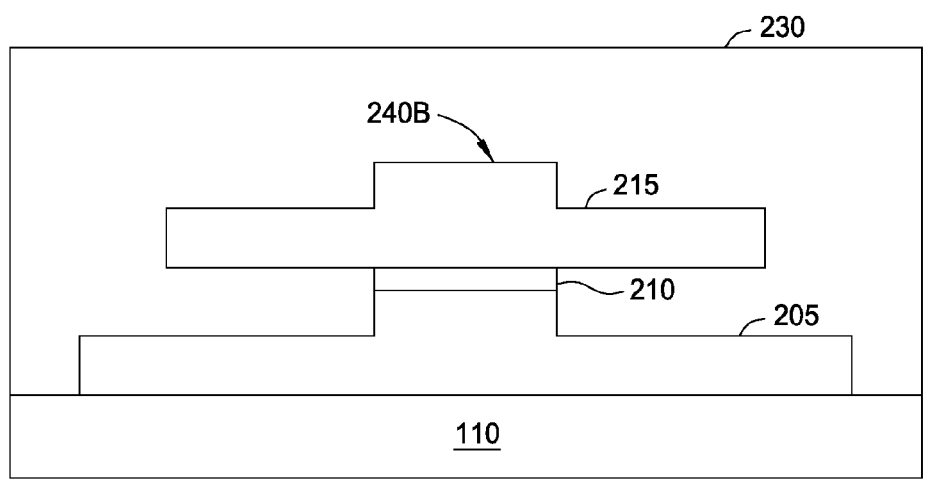

In FIG. 4E, additional dielectric material 230 is deposited onto the modulator. Although not shown, metal contacts and vias may also be formed to enable the optical system to drive respective voltages onto the waveguides 205 and 215 to control the modulation of the optical signal.

Figure 5A:
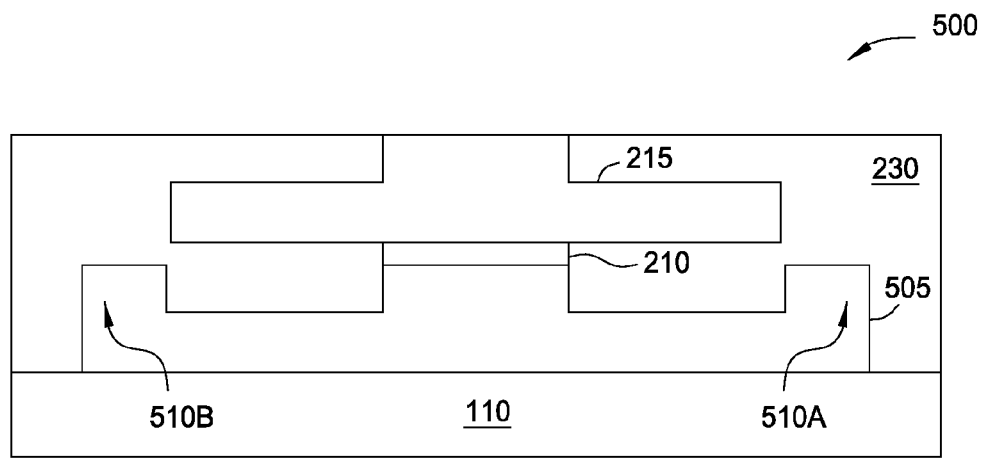
FIGS. 5A-5B illustrate cross-sectional views of aligned modulators with ribbed waveguides, according to one embodiment disclosed herein.
Figure 5B:
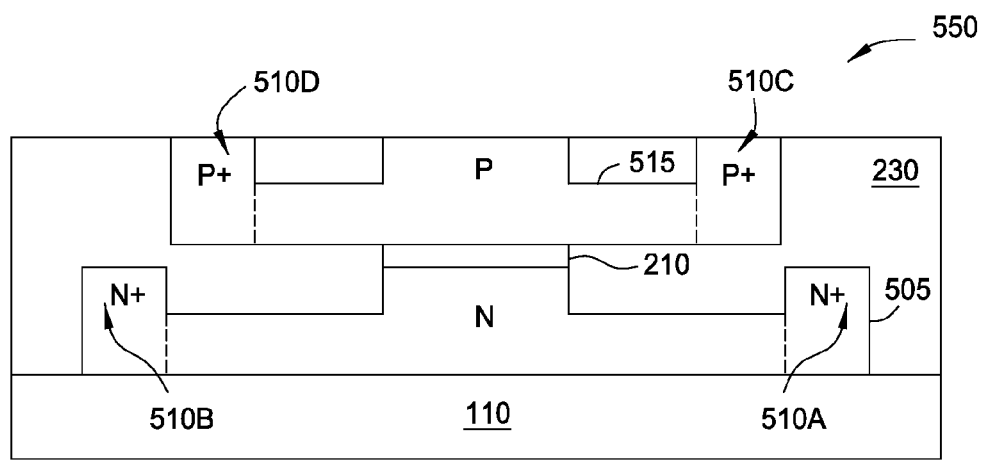

FIGS. 5A-5B illustrate cross-sectional views of aligned modulators with ribbed waveguides, according to one embodiment disclosed herein. Specifically, FIG. 5A illustrates that the lower waveguide 505 is formed into a ridge waveguide that include raised ends to create the wings 510A and 510B. That is, like modulator 200 in FIG. 2A, the lower and upper waveguides 505 and 215 include centered ridges that are aligned over the gate dielectric layer 210. However, unlike modulator 200, the lower waveguide 505 includes wings 510 that are used for connecting the waveguide 505 to metal contacts and the voltage source (not shown). Using the wings 510 may be advantageous in some methods of fabricating the modulator 500 to aid in making electrical contacts to the lower waveguide 505.

Modulator 500 may be formed using the process shown in FIGS. 4A-4E with the additional process step of forming the wings during the step shown in FIG. 4A. If the wings 510 are the same thickness as the ridge portion 240A, then both features may be patterned and etched into the silicon layer 105 in the same step. However, if the thicknesses are different, two different etching steps may be required.

FIG. 5B illustrates a modulator 550 with wings on both the lower and upper waveguides 505 and 515. That is, the wings 510 added to the lower waveguide 505 may also be added to the leftmost and rightmost portions of the upper waveguide 515. The thickness of the wings 510C and 510D on the upper waveguide 515 may be the same thickness as the ridge on the waveguide 515 or a different thickness. Moreover, the wings 510A-D may be more heavily doped with the n-type and p-type dopant than the rest of the waveguide. Of course, in FIG. 5A, the wings 510A-B the in lower waveguide 505 and the leftmost and rightmost portions of the upper waveguide 215 may be more heavily doped than the rest of the material of the waveguide.

Figure 6A:
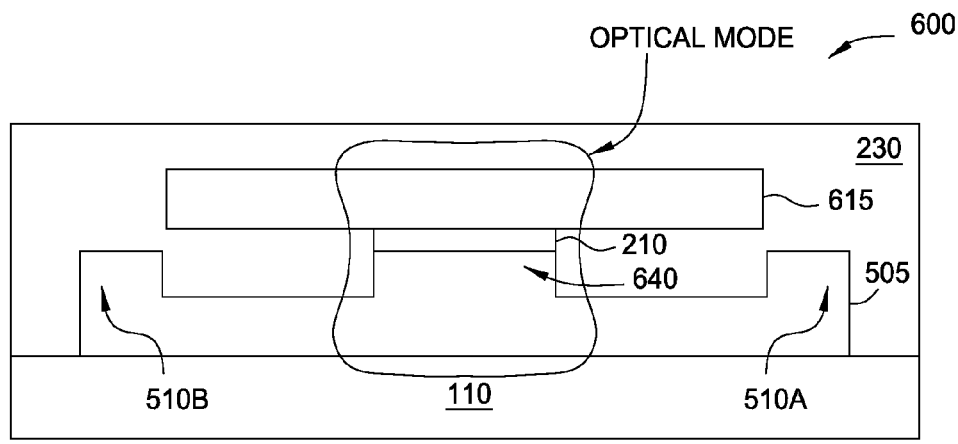
FIGS. 6A-6B illustrate cross-sectional views of aligned modulators with upper waveguides without ridges, according to one embodiment disclosed herein.
Figure 6B:
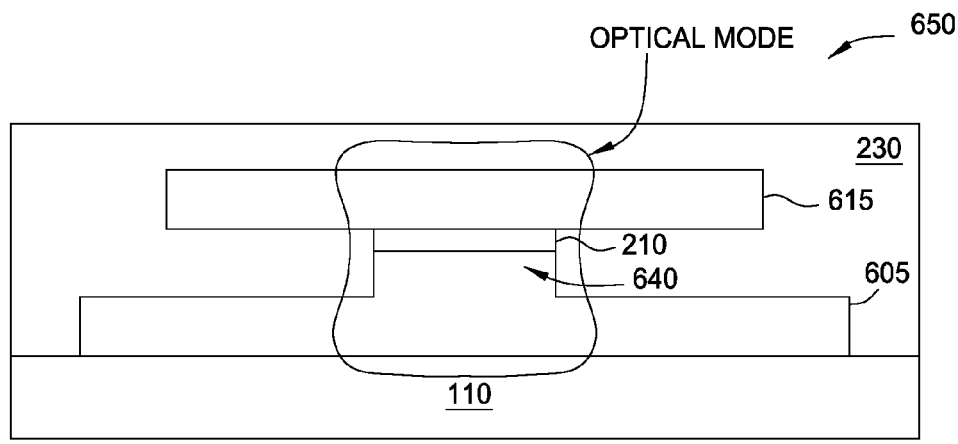

FIG. 6A-6B illustrates cross-sectional views of modulators with upper waveguides without ridges, according to one embodiment disclosed herein. As shown in FIG. 6A, the lower waveguide 505 is similar to the lower waveguide in FIG. 5A—e.g., both waveguides includes a centered ridge 640 flanked by wings 510 for providing lateral optical confinement. That is, because the center ridge 640 is surrounded on two sides by the dielectric material 230, the optical mode is more tightly confined near the charge modulation region relative to a waveguide where the ridge 640 is omitted—e.g., where the upper surface of the waveguide 505 is a single plane. However, unlike modulator 500, the upper waveguide 615 of modulator 600 does not have a centered ridge aligned with the ridge 640 on the lower waveguide 505. Although this may reduce the efficiency of the modulator 600 because the optical mode may not be centered in the charge modulation region, the process for fabricating the upper waveguide 615 only requires a single process step rather than the upper waveguide shown in FIG. 5A which may require multiple process steps—e.g., multiple etching steps.

As shown in FIG. 6B, the modulator 650 includes a lower waveguide 605 that does not include the wings 510A and 510B in modulator 600. Despite this structural difference, the modulator 650 may be the same as modulator 600 in FIG. 6A. Moreover, the waveguides FIGS. 6A and 6B may be doped as shown in FIG. 5B.

Figure 7:
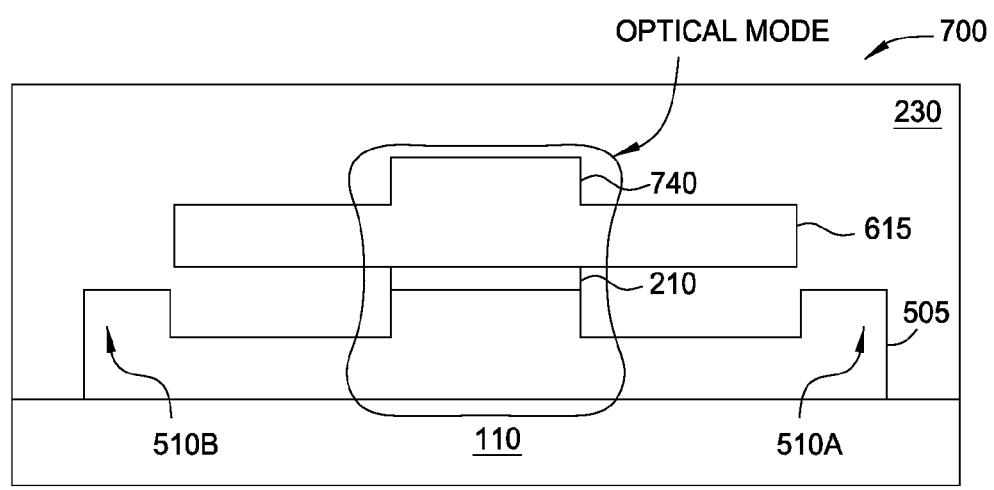
FIG. 7 illustrates a cross-sectional view of an aligned modulator with an upper waveguide with a ridge made from a different material, according to one embodiment disclosed herein.

FIG. 7 illustrates a cross-sectional view of an aligned modulator 700 with an upper waveguide 615 with a ridge 740 made from a different material, according to one embodiment disclosed herein. Specifically, the material used to form the upper waveguide 615 is a different from the material used to form ridge 740. For example, the upper waveguide 615 may be polycrystalline silicon while the ridge 740 is silicon nitride or some other dielectric material different from the dielectric material 230. Alternatively, if the waveguide 615 was made from crystalline silicon, then the ridge 740 may be polycrystalline silicon. The ridge 740 may reduce the vertical confinement of the optical mode compared to the optical mode associated with the modulator 600 in FIG. 6A, but the optical mode here may be aligned such that the greatest intensity of the optical signal is within the charge modulation region, thereby improving the efficiency of the modulator 700. Stated differently, by aligning ridge 740 with the ridge on the lower waveguide 505 (and assuming the ridges are the same thicknesses), the center of the optical mode may be substantially within the charge modulation region. Because the center of the optical mode in this embodiment has the greatest intensity of the optical signal, the efficiency of the modulator 700 may be improved relative to modulator 600.

Figure 8A:
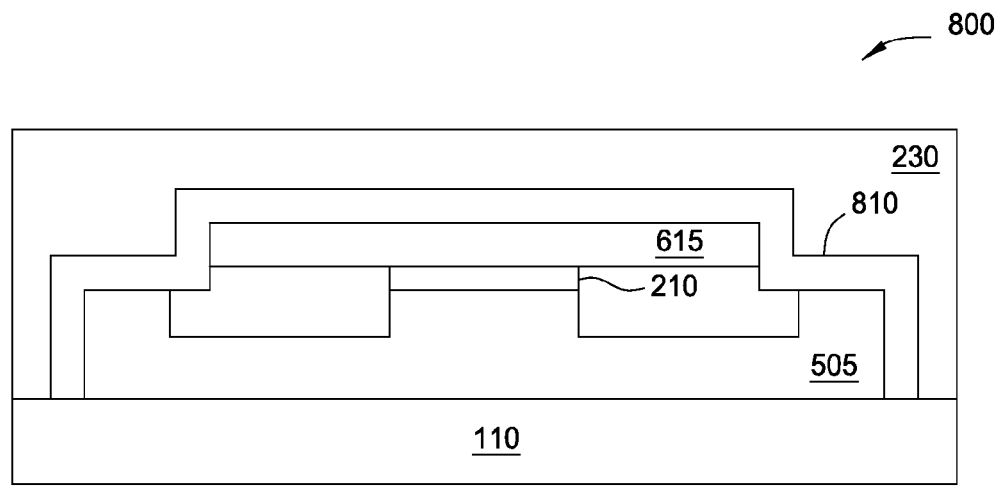
FIGS. 8A-8C illustrate cross-sectional views of aligned modulators with nitride capping layers, according to embodiments disclosed herein.
Figure 8B:
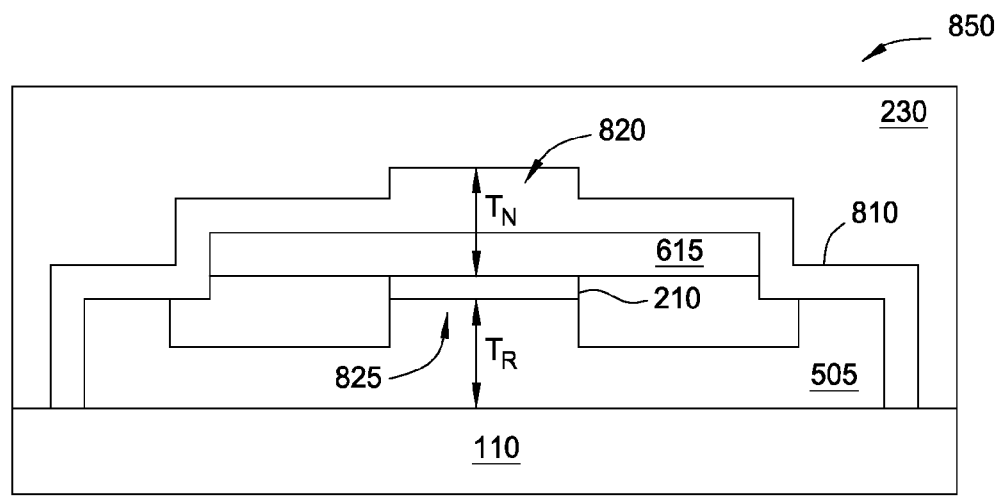
Figure 8C:
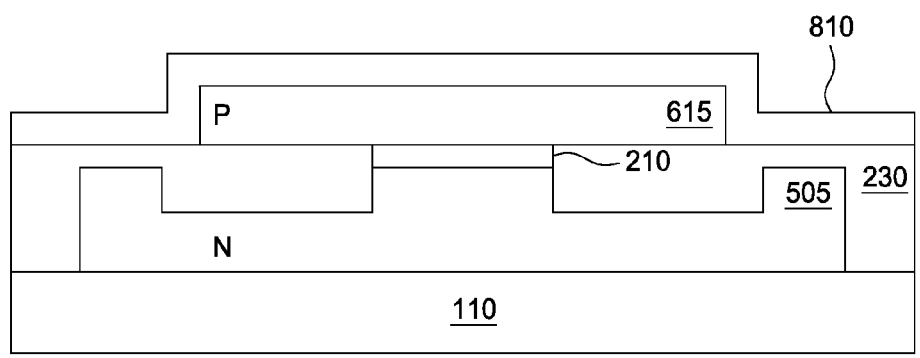

FIGS. 8A-8C illustrate cross-sectional views of aligned modulators with nitride capping layers, according to embodiments disclosed herein. Specifically, FIG. 8A illustrates a modulator 800 that is similar to modulator 600 of FIG. 6A except that modulator 800 includes a nitride layer 810 covering the upper and lower waveguides 615 and 505. FIG. 8A illustrates that the modulator 600 is compatible with fabrication processes where the layer of nitride 810 is disposed between the waveguides 505, 615 and the dielectric material 230.

FIG. 8B illustrates forming a ridge 820 in a silicon nitride layer 815 disposed between the waveguides 505, 615 and the dielectric material 230. Modulator 850 is similar to modulator 800 of FIG. 8A except that modulator 850 includes the ridge 820. Like in FIG. 7, the ridge 820 may aid in centering the optical mode in the charge modulation region (e.g., centering the optical mode near the gate dielectric layer 210). Also, the material of ridge 820 may be different than the material of waveguide 615 (e.g., the ridge 820 is formed from silicon nitride while the upper waveguide 615 is polycrystalline silicon).

Because of the added nitride layer 815, the thickness of ridge 820 may be smaller than the thickness of a ridge 825 in the lower waveguide 505. In one embodiment, the total thickness of the nitride layer 815 (including the ridge 820) and the upper waveguide 615 (shown as $T_N$) is approximately equal to the thickness of the lower waveguide 505 that includes the ridge 825 (shown as $T_R$). Doing so may center the optical mode within the charge modulation region as explained above.

FIG. 8C also includes a nitride capping layer 810 but here the nitride layer 810 does not extend down to the substrate 110. As shown, the nitride layer 810 conforms to the upper waveguide 615 and extends on an upper surface of the dielectric material 230. This structure may more accurately reflect the structure of the modulator for some integrated circuit processing techniques. As such, any of the embodiments described below with a nitride capping layer (e.g., FIGS. 9B, 9C, 9D, 11A, 11B, 11C) may be arranged as shown in FIG. 8C rather than with a nitride layer that conforms to the lower waveguide 505 or extends to the substrate 110. Moreover, in one embodiment, the nitride layer 810 may be further processed to include the ridge 820 as shown in FIG. 8B.

FIGS. 9A-9D illustrate a flow for fabricating a modulator with a cap on the upper waveguide, according to one embodiment disclosed herein. Specifically, the flow begins in FIG. 9A where the waveguides 505 and 615 have already been disposed and doped their respective conductivity types. For instance, the same process shown in FIGS. 4A-4E may be used to fabricate the structure shown in FIG. 9A except that the lower waveguide 505 includes the wing portions 510A and 510B. Moreover, in the embodiment shown, the upper waveguide 615 is patterned to its desired width such that the width of waveguide 1015 is less than the width of waveguide 1005 which permits electrical connections to an upper surface in the modulator as shown by the top view of FIG. 3A. Alternatively, although not shown, the widths of the upper and lower waveguides 615, 505 may be formed to provide the interleaved design shown by the top view in FIG. 3B.

Figure 9A:
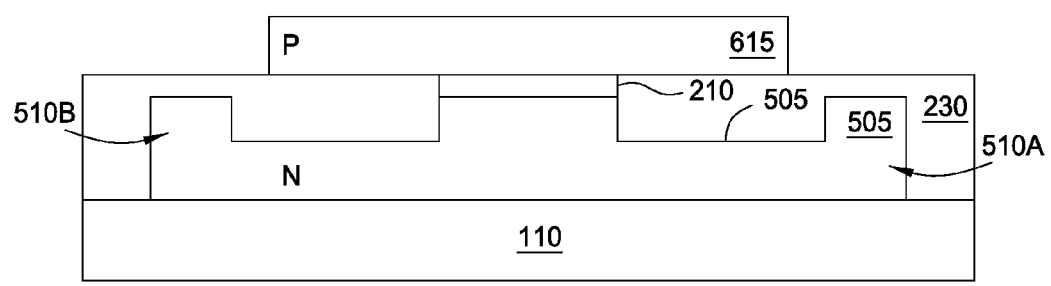
FIGS. 9A-9D illustrate a flow for fabricating a modulator with a cap on the upper waveguide, according to one embodiment disclosed herein.
Figure 9B:
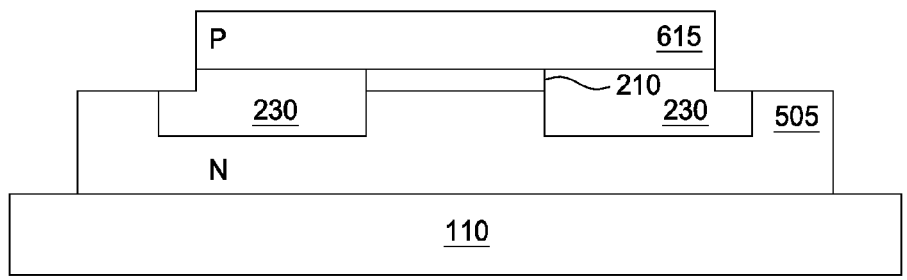
Figure 9C:
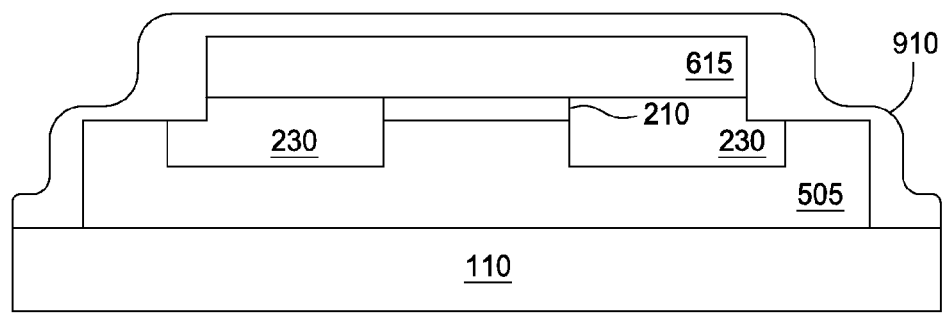
Figure 9D:
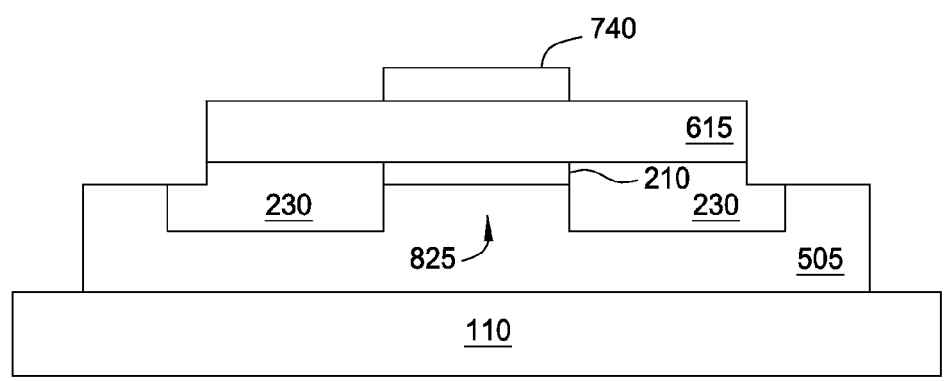

In FIG. 9B, the dielectric material 230 may be selectively removed to expose portions of the lower waveguide 505. In FIG. 9C, a conformal layer of silicon nitride 915 is disposed onto the modulator. In FIG. 9D, the nitride layer 915 is patterned and etched to leave only the ridge 740 on the top surface of the upper waveguide 615 to result in the modulator 700 shown in FIG. 7.

Alternatively, to fabricate modulator 800 in FIG. 8A, instead of selectively removing portions of the nitride layer 910 in FIG. 9D, this process step may be omitted. That is, the deposition of the nitride layer 910 may be controlled in order to form the desired thickness of the nitride layer 810 in modulator 800.

Alternatively, to fabricate modulator 850 in FIG. 8B, an additional process step (or steps) is performed to form the ridge 820 that is aligned with the ridge 825 on the lower waveguide 505. In one embodiment, the nitride layer 910 may be patterned with resist where an opening is located at the desired location of the ridge 820. Additional silicon nitride is then deposited to form the ridge 820 and the excess silicon nitride is removed. In another embodiment, the silicon nitride layer 910 may have a thickness that is equal to or greater than the thickness of the capping layer 815 that include ridge 820. To form the ridge 820, a portion of resist is patterned above the gate dielectric layer 210 which masks this portion of the nitride layer 910. During a subsequent etching step, the silicon nitride underneath the resist is not etched while the neighboring nitride layer 910 is etched to result in the nitride layer 815 shown in FIG. 8B which includes the ridge 820 aligned with ridge 825.

Figure 10:
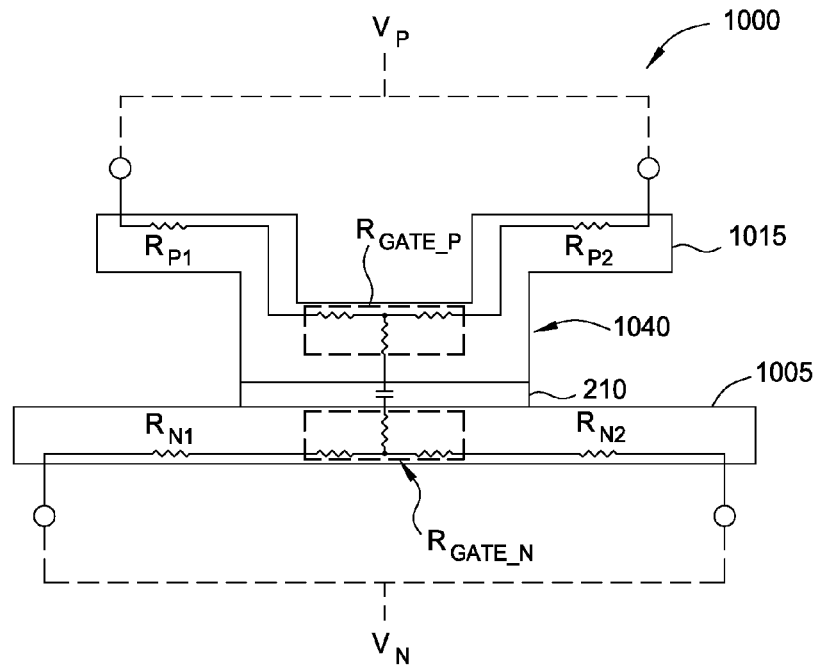
FIG. 10 illustrates a cross-sectional view of a modulator with a u-shaped upper waveguide, according to one embodiment disclosed herein.

FIG. 10 illustrates a cross-sectional view of a modulator 1000 with a u-shaped upper waveguide 1015, according to one embodiment disclosed herein. As shown, the upper waveguide 1015 forms a ridge portion 1040 that extends in a direction towards the gate dielectric layer 210. One advantage of ridge portion 1040 is that it helps to laterally confine the optical mode near the charge modulation region proximate to the gate dielectric layer 210.

FIG. 10 also illustrates the equivalent circuit model for modulator 1000. Like the modulators discussed above, modulator 1000 may have a lower RC constant than a modulator where one end of the upper waveguide overlaps a second, different end of the lower waveguide. For example, by centering the waveguides, the distance from the electrical contacts to the charge modulation region is halved (assuming the wave guides' widths are the same). Moreover, by driving both ends of the waveguides 1015 and 1005 to the same voltage (e.g., $V_P$ and $V_N$, respectively), the resistance $R_{P1}$ and $R_{P2}$ as well as $R_{N1}$ and $R_{N2}$ are in parallel which further reduces the RC constant and may increase the modulator's bandwidth. In one embodiment, the wings 510 shown in FIGS. 5A and 5B may be added to the upper waveguide 1015, the lower waveguide 1005, or both.

Figure 11A:
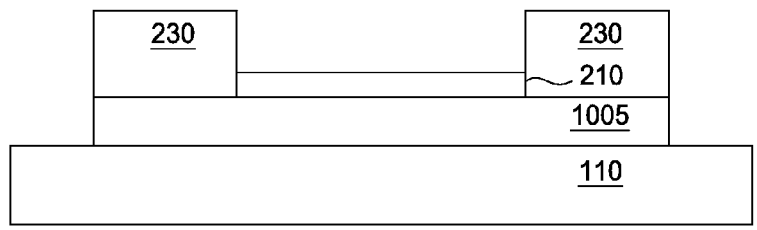
FIGS. 11A-11C illustrate a flow for fabricating a modulator with a u-shaped upper waveguide, according to embodiments disclosed herein.
Figure 11B:
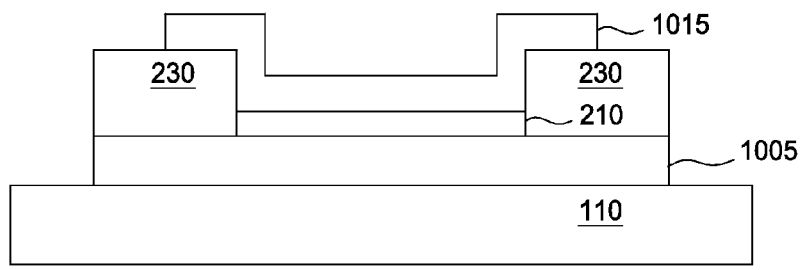
Figure 11C:
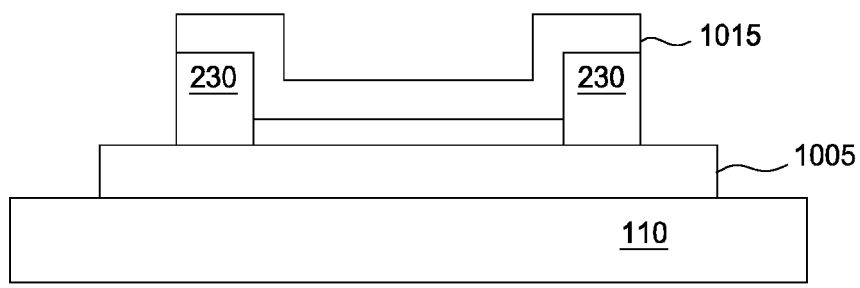

FIGS. 11A-11C illustrate a flow for fabricating a modulator with a u-shaped upper waveguide 1015, according to embodiments disclosed herein. FIG. 11A illustrates a structure where the lower waveguide 1005 and gate dielectric layer 210 are already disposed on the insulating layer 110. Moreover, the dielectric material 230 has been deposited and formed with a thickness that establishes the distance which the ridge portion of the upper waveguide extends towards the gate dielectric layer 210.

In FIG. 11B, the upper waveguide 1015 (e.g., crystalline or polycrystalline silicon) is deposited at least onto the dielectric material 230 and the gate dielectric layer 210. In one or more process steps, the upper waveguide 1015 is patterned to its desired width. For example, the width of waveguide 1015 may be less than the width of waveguide 1005 to permit electrical connections to an upper surface in the modulator as shown by the top view of FIG. 3A. Alternatively, although not shown, the widths of the upper and lower waveguides 1005, 1015 may be formed to provide the interleaved design shown by the top view in FIG. 3B.

In FIG. 11C, the dielectric material covering the lower waveguide 1005 may be at least partially removed to allow electrical contacts to be deposited onto the ends of the waveguide 1005. In subsequent process steps (not shown), the waveguides 1005 and 1015 may be connected to respective voltage sources for controlling optical modulation with, for example, the conductive contacts and vias as shown in FIG. 2A.

Figure 12:
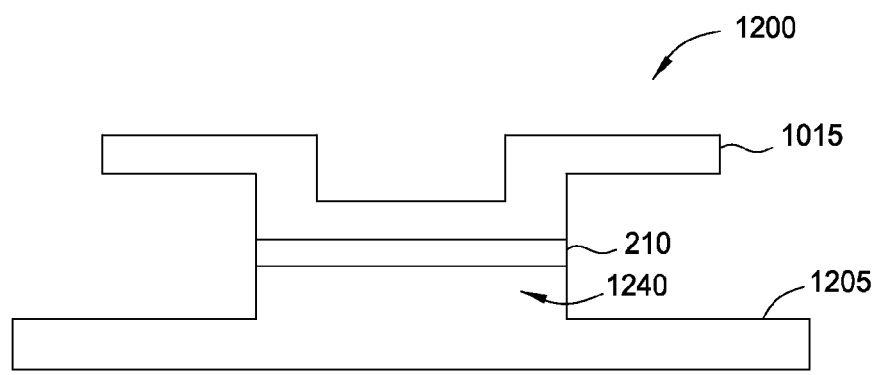
FIG. 12 illustrates a cross-sectional view of a modulator with a u-shaped upper waveguide and a lower waveguide with a cap, according to one embodiment disclosed herein.

FIG. 12 illustrates a cross-sectional view of a modulator 1200 with a u-shaped upper waveguide 1015 and a lower waveguide 1205 with a ridge portion 1240, according to one embodiment disclosed herein. The modulator 1200 differs from the modulator 1000 in that the lower waveguide 1205 includes the ridge portion 1240 which may further aid in laterally confining the optical mode as discussed above. In one embodiment, the distance which the ridge portion 1040 extends toward the gate dielectric layer 210 and the thickness of the ridge portion 1240 are controlled in order to confine the optical mode such that the portion of the optical signal with the greatest intensity is within the charge modulation region—e.g., proximate to the gate dielectric layer 210. Furthermore, in one embodiment, the wings 510 shown in FIGS. 5A and 5B may be added to the upper waveguide 1015, the lower waveguide 1005, or both.

Figure 13:
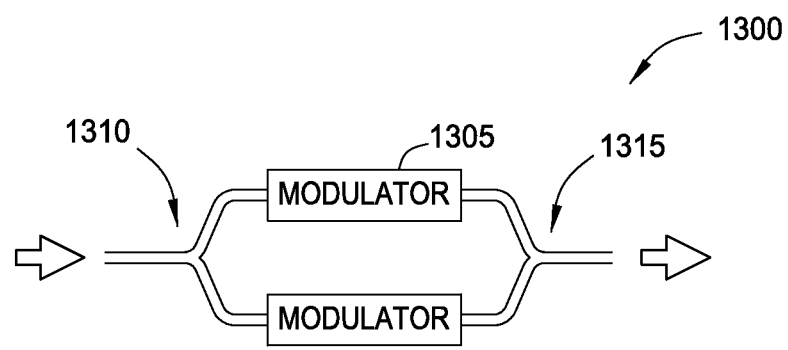
FIG. 13 illustrates a Mach-Zehnder interferometer, according to one embodiment described herein.

FIG. 13 illustrates a Mach-Zehnder interferometer (MZI) 1300, according to one embodiment described herein. Specifically, FIG. 13 illustrates an MZI 1300 that includes an input 1310 that receives an optical signal (e.g., a continuous wave) and an output 1315 that transmits an optical signal that is modulated based on the electrical signals used to drive optical modulators 1305. The input 1310 includes a y-splitter that splits an incoming continuous wave into each of the branches. The split optical signals then pass through charge modulation regions in the modulators 1305 described above. The modulated optical signals are then recombined at output 1315 to form a modulated optical signal. Moreover, the MZI structure shown in MZI 1300 may be used with any of the modulators discussed herein—e.g., the modulators shown in FIGS. 2A-B, 3A-B, 5A-B, 6A-B, 7, and 10.

Figure 14A:
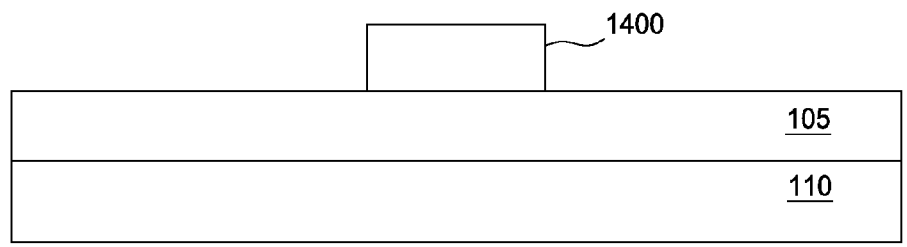
FIGS. 14A-14E illustrate a flow for fabricating a modulator using a local oxidation process, according to one embodiment described herein.

FIGS. 14A-14E illustrate a flow for fabricating a modulator using a local oxidation process, according to one embodiment described herein. As shown in FIG. 14A, a mask 1400 is formed on a top surface of the silicon surface layer 105. In one example, the mask 1400 is formed from silicon nitride but is not limited to such. The mask 1400 may be any material that is substantially unaffected during a thermal oxidation process. In one embodiment, the surface layer 105 and the insulation layer 110 may be part of a SOI structure.

Figure 14B:
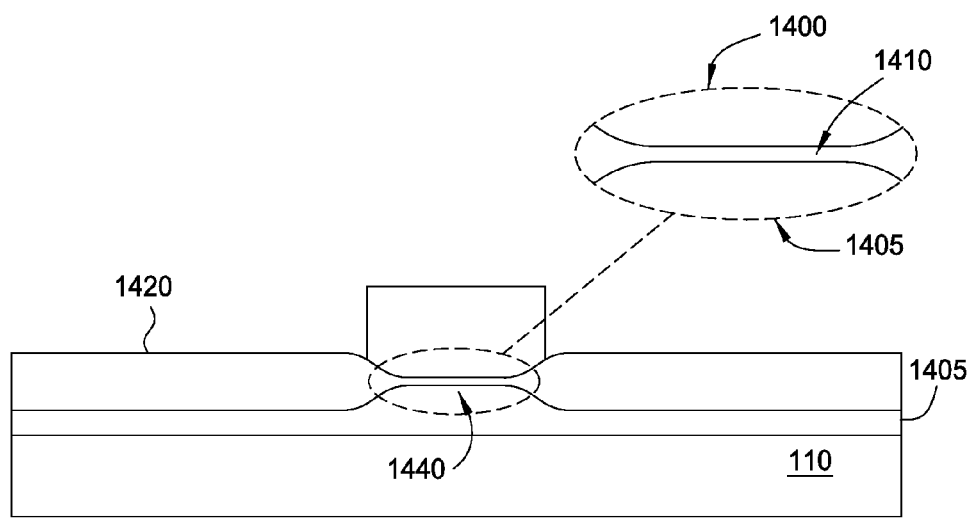

In FIG. 14B, the structure is oxidized. As shown, the silicon surface layer 105 is subjected to a thermal oxidation process (where, for example, local oxidation of silicon (LOCOS) may be used) to form a lower waveguide 1405 and a silicon dioxide layer 1420. The mask 1400 impedes or inhibits the oxidation of the underlying silicon material in the lower waveguide 1405. Conversely, the silicon material that is not covered by the mask 1400 oxidizes faster to form a thicker silicon dioxide layer 1420. These feature alignment creates a ridge 1440 in the lower waveguide 1405. Stated differently, because only a small portion of the silicon material in the silicon layer 105 underneath the mask 1400 is converted to silicon dioxide while a larger portion of the silicon material not underneath the mask 1400 is converted, the ridge 1440 is formed. In some embodiments, the ridge 1440 has sides with less slope than the ridges illustrated above that have sides that are more vertical (e.g., greater slopes). Nonetheless, the overall thickness and width of the ridge 1440 may be similar to the dimensions of the ridges described above.

The u-shape interface between the mask 1400 and layer 1420 forms as a result of oxidizing the silicon layer 105 to the two layers: waveguide 1405 and silicon dioxide layer 1420 where the combined thickness of these layers is thicker than the original silicon layer 105 shown in FIG. 14A. Because only a thin layer of silicon material is oxidized underneath the mask 1400, this portion of the structure expands less than the portions not covered by the mask 1400 to create the u-shaped interface.

FIG. 14B also includes a blow-out that provides a more detailed look at the interface between the mask 1400 and the ridge 1440 on the lower waveguide 1405. As shown here, the oxidizing process results in a thin gate dielectric 1410 between the ridge 1440 and the lower portion of the mask 1400. As shown, the gate dielectric layer 1410 connects the rightmost and leftmost portions of the silicon dioxide layer 1420 to form a continuous layer that may be formed in the same thermal oxidizing step. The dimensions of the gate dielectric layer 1410 may be similar to the dimensions of the gate dielectric layers described above. For example, the width of the layer 1410 may be less than 1 micron while the thickness may range from 20 nanometers to 2 nanometers.

Figure 14C:
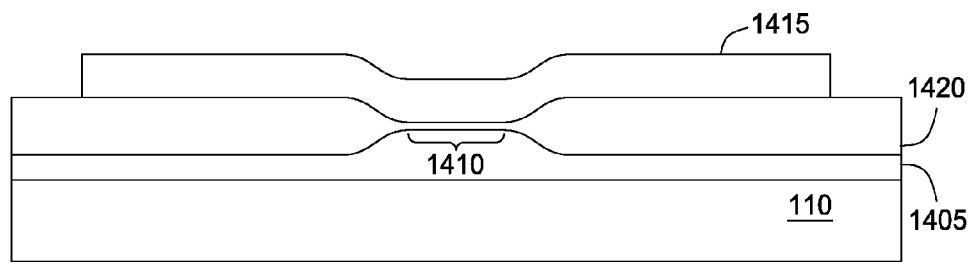

In FIG. 14C, the mask is removed and an upper waveguide 1415 is conformally deposited onto an upper surface of layer 1420. The waveguide 1415 may include strained silicon, $Si_xGe_{1-x}$, substantially single crystal silicon (i.e., crystalline silicon), polycrystalline silicon, and combinations thereof. Although not shown, electrical connections may be formed on the upper and lower waveguides 1405, 1415 to create a charge modulation region proximate to the gate dielectric layer 1410 as described above. In one embodiment, the process shown in FIGS. 14A-14C may be used to form a modulator similar to one shown in FIG. 12 where the upper waveguide 1415 has portion that extends towards the ridge 1440 of the lower waveguide 1405 in a region proximate to the gate layer 1410. Although not shown in FIG. 14C, the modulator may be backfilled with additional dielectric material that covers the top surface and sides of the upper waveguide 1415.

In another embodiment, the upper waveguide 1415 is further processed to have a ridge structure on its top surface. For example, the upper waveguide 1415 may have a top surface similar to the top surface of the upper waveguide 205 in FIG. 2A where ridge 240B is centered over the gate dielectric layer 1410. As such, in this example, the upper waveguide 1415 includes both a portion the extends towards the gate layer 1410 as shown in FIG. 14C as well as a ridge centered with the gate region 1410.

Figure 14D:
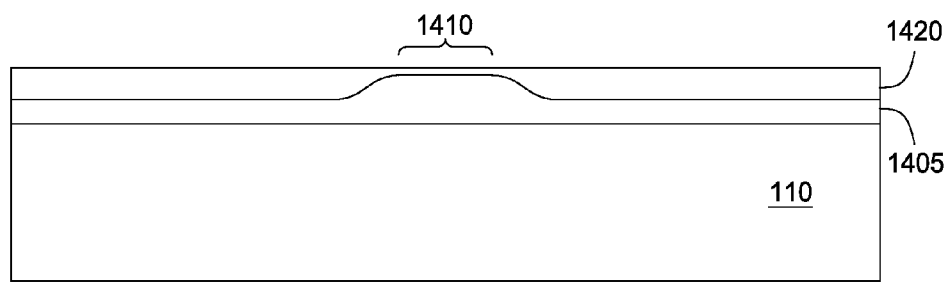
Figure 14E:
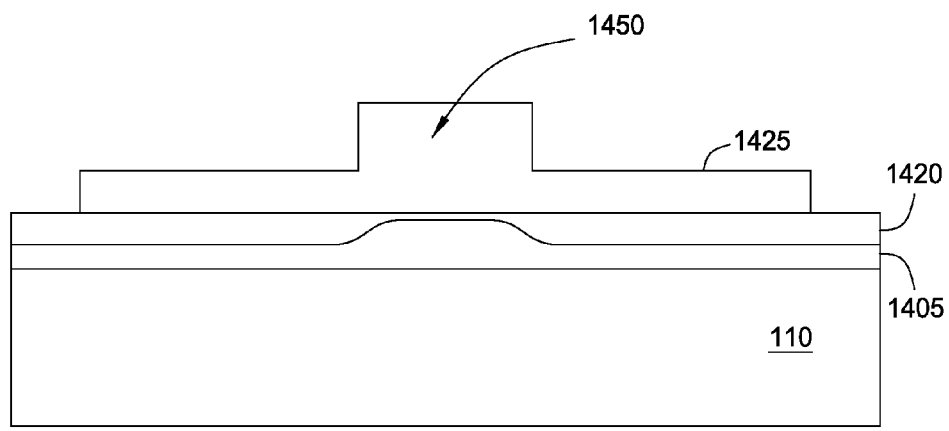

FIGS. 14D and 14E illustrate alternative process steps to FIG. 14C. That is, instead of depositing the upper waveguide as shown in FIG. 14C, in FIG. 14D the mask is removed and the silicon dioxide layer 1420 is planarized. In FIG. 14E, an upper waveguide 1425 is formed on the planarized surface. In contrast to FIG. 14C, FIG. 14E illustrates a modulator where the upper waveguide 1425 does not include a portion that extends down towards the gate layer 1410. Instead, the lower surface of the waveguide 1420 is planar. Moreover, the waveguide 1425 includes a ridge 1450 which may be made from the same or different material as the remaining portion of the waveguide 1425. As such, the process steps shown in FIGS. 14D and 14E may be used to form the modulators shown in FIG. 2A-2B, 7, 8B, or 9D. Alternatively, the upper waveguide 1425 may formed to include a planar top surface—i.e., the ridge 1450 is omitted. In this scenario, the process steps in FIGS. 14D and 14E may be used to form the modulators shown in FIG. 6A-6B, 8A, 8C, 9A, or 9B.

Although not shown, the structure in FIG. 14E may be backfilled with additional dielectric material to cover the top surface and sides of the upper waveguide 1425. Additionally, electrical connections can be formed on the top surfaces of the lower and upper waveguides 1405, 1425 to generate a charge modulation region near the gate layer 1410 as described above.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:

1. An optical device, comprising:
a first silicon waveguide disposed on a dielectric substrate, the first silicon waveguide comprising a first ridge extending in a direction of an optical path;
a dielectric layer having a lower surface disposed on an upper surface of the first ridge;
a second silicon waveguide disposed on an upper surface of the dielectric layer opposite the lower surface of the dielectric layer, the second silicon waveguide comprising a second ridge extending in the direction of the optical path, wherein the second ridge at least partially overlaps both the dielectric layer and the first ridge, and wherein the first silicon waveguide is doped a first conductivity type and the second silicon waveguide is doped a second, different conductivity type;
a first electrical contact coupled to the first silicon waveguide; and
a second electrical contact coupled to the second silicon waveguide,
wherein the first electrical contact and a third electrical contact are coupled to a same side of the first silicon waveguide, wherein the second electrical contact and a fourth electrical contact are coupled to a same side of the second silicon waveguide, wherein the optical device is configured to receive a first voltage at the first and third electrical contacts and a second voltage at the second and fourth electrical contacts to generate a voltage potential that establishes a charge modulation region.

2. The optical device of claim 1, wherein respective widths of the first and second ridges in a direction perpendicular to the direction of the optical path are equal.

3. The optical device of claim 2, wherein the second ridge completely overlaps the first ridge.

4. An optical device, comprising:
a first silicon waveguide disposed on a dielectric substrate, the first silicon waveguide comprising a first ridge extending in a direction of an optical path;
a dielectric layer having a lower surface disposed on an upper surface of the first ridge;
a second silicon waveguide disposed on an upper surface of the dielectric layer opposite the lower surface of the dielectric layer, the second silicon waveguide comprising a second ridge extending in the direction of the optical path, wherein the second ridge at least partially overlaps both the dielectric layer and the first ridge, and wherein the first silicon waveguide is doped a first conductivity type and the second silicon waveguide is doped a second, different conductivity type;
a first electrical contact coupled to the first silicon waveguide; and
a second electrical contact coupled to the second silicon waveguide,
wherein the first electrical contact and a third electrical contact are coupled to a same side of the first silicon waveguide, wherein the first ridge is centered on the first silicon waveguide in a direction perpendicular to the direction of the optical path and the first ridge is located between the first and third electrical contacts, wherein the first, second, and third electrical contacts are configured to generate a voltage potential that establishes a charge modulation region comprising at least respective portions of the first ridge, the dielectric layer, and the second silicon waveguide.

5. The optical device of claim 1, wherein the first silicon waveguide comprises raised wings, wherein the first ridge is arranged between the raised wings, and wherein a dielectric material is disposed between the raised wings and the first ridge.

6. The optical device of claim 5, wherein the raised wings are more heavily doped the first conductivity type than a remaining portion of the first silicon waveguide, wherein the first electrical contact is coupled to a first one of the raised wings and the third electrical contact is coupled to a second one of the raised wings.

7. The optical device of claim 1, wherein the second silicon waveguide comprises raised wings, wherein the second ridge is arranged between the raised wings, and wherein a dielectric material is disposed between the raised wings and the second ridge.

8. The optical device of claim 1, wherein the second ridge on the second silicon waveguide comprises a different material than a remaining portion of the second silicon waveguide.

9. An optical device, comprising:
a first waveguide disposed on a substrate, the first waveguide comprising a first ridge extending in a direction of an optical path;
a second waveguide disposed above an upper surface of the first ridge opposite a lower surface of the first waveguide contacting the substrate, the second waveguide comprising a second ridge extending in the direction of the optical path, wherein the second ridge at least partially overlaps the first ridge in a first direction perpendicular to the direction of the optical path, and wherein the first waveguide is doped a first conductivity type and the second waveguide is doped a second, different conductivity type;
a first electrical contact coupled to the first waveguide; and
a second electrical contact coupled to the second waveguide,
wherein the first electrical contact and a third electrical contact are coupled to a same side of the first waveguide, wherein the second electrical contact and a fourth electrical contact are coupled to a same side of the second waveguide, wherein the optical device is configured to receive a first voltage at the first and third electrical contacts and a second voltage at the second and fourth electrical contacts to generate a voltage potential that establishes a charge modulation region.

10. The optical device of claim 9, wherein respective widths of the first and second ridges in a second direction perpendicular to the direction of the optical path are the same.

11. The optical device of claim 9, wherein the first and second ridges comprise a same material as remaining portions of the first and second waveguides, respectively.

12. The optical device of claim 9, wherein the first ridge comprises a same material as a remaining portion of the first waveguide and the second ridge comprises a different material as a remaining portion of the second waveguide, wherein the different material of the second ridge is a dielectric material.

13. The optical device of claim 1, wherein the second ridge is disposed on a first surface of the second silicon waveguide that is opposite a second surface of the second silicon waveguide, wherein the second surface contacts the upper surface of the dielectric layer.

14. The optical device of claim 4, wherein the second ridge is disposed on a first surface of the second silicon waveguide that is opposite a second surface of the second silicon waveguide, wherein the second surface contacts the upper surface of the dielectric layer.

15. The optical device of claim 9, wherein the second ridge is disposed on a first surface of the second waveguide that is opposite a second surface of the second waveguide, wherein the second surface faces the first waveguide.

* * * * *